US012519203B2

(12) United States Patent
Wu et al.

(10) Patent No.: US 12,519,203 B2
(45) Date of Patent: Jan. 6, 2026

(54) ANTENNA INSTALLATION DEVICE

(71) Applicant: ZTE CORPORATION, Shenzhen (CN)

(72) Inventors: Shenyi Wu, Shenzhen (CN); Yu Jiang, Shenzhen (CN); Gongzhe Zhang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 18/705,797

(22) PCT Filed: Mar. 14, 2022

(86) PCT No.: PCT/CN2022/080792

§ 371 (c)(1),
(2) Date: Apr. 29, 2024

(87) PCT Pub. No.: WO2023/082514

PCT Pub. Date: May 19, 2023

(65) Prior Publication Data

US 2024/0421462 A1 Dec. 19, 2024

(30) Foreign Application Priority Data

Nov. 9, 2021 (CN) ......................... 202111322484.8

(51) Int. Cl.
*H01Q 3/00* (2006.01)
*H01Q 1/12* (2006.01)

(52) U.S. Cl.
CPC ................................. *H01Q 1/1264* (2013.01)

(58) Field of Classification Search
CPC ...... H01Q 1/1264; H01Q 1/1228; H01Q 3/08; H01Q 1/12; H01Q 3/04
See application file for complete search history.

(56) References Cited

U.S. PATENT DOCUMENTS

2020/0365985 A1* 11/2020 Clifford ................... H01Q 3/08
2022/0190473 A1* 6/2022 Kim ..................... H01Q 1/1264
(Continued)

FOREIGN PATENT DOCUMENTS

CN 201570583 U 9/2010
CN 207637984 U 7/2018
(Continued)

OTHER PUBLICATIONS

International Search Report and Written Opinion in Corresponding International Application No. PCT/CN2022/080792, mailed Jul. 20, 2022; 16 pgs.

(Continued)

*Primary Examiner* — Amy J. Sterling
(74) *Attorney, Agent, or Firm* — HAUPTMAN HAM, LLP

(57) ABSTRACT

Disclosed is an antenna installation device, including: a first holding pole component, a second holding pole component, a back panel and an azimuth angle power module. The first holding pole component and the second holding pole component are respectively configured to be fixed on a holding pole. The back panel is rotatably connected to both the first holding pole component and the second holding pole component, and the back panel is configured to fix an antenna device. One end of the azimuth angle power module is connected to the second holding pole component, and another end of the azimuth angle power module is connected to the back panel. The azimuth angle power module is configured to drive the back panel to rotate around the holding pole to adjust an azimuth angle of the antenna device.

9 Claims, 5 Drawing Sheets

(56) References Cited

U.S. PATENT DOCUMENTS

| | | | | |
|---|---|---|---|---|
| 2024/0213650 | A1* | 6/2024 | Wang | H01Q 1/246 |
| 2025/0079686 | A1* | 3/2025 | Lewry | F16B 7/06 |

FOREIGN PATENT DOCUMENTS

| | | | |
|---|---|---|---|
| CN | 109473783 | A | 3/2019 |
| CN | 209625434 | U | 11/2019 |
| CN | 110829028 | A | 2/2020 |
| CN | 212412182 | U | 1/2021 |
| CN | 113594699 | A | 11/2021 |
| JP | 2002050913 | A | 2/2002 |
| KR | 102157068 | B1 | 9/2020 |

OTHER PUBLICATIONS

Search Report in Corresponding European Application No. 22891326.5, dated Jan. 28, 2025; 13 pgs.

* cited by examiner

ANTENNA INSTALLATION DEVICE

CROSS-REFERENCE TO RELATED APPLICATIONS

The present application is a U. S. National Phase application of International Application No. PCT/CN2022/080792, filed on Mar. 14, 2022, which claims priority to Chinese Patent Application No. 202111322484.8, filed on Nov. 9, 2021.

TECHNICAL FIELD

The embodiments of the present application relate to the technical field of communication, and in particular to an antenna installation device.

BACKGROUND

In the engineering design of mobile communication networks, communication antennas should be reasonably selected according to actual conditions such as network coverage requirements, traffic distribution, anti-interference requirements, network service quality, and so on. It is a conventional optimization method for communication antennas to achieve network coverage effect by adjusting the downtilt angle and direction angle. Communication antennas are usually installed on relatively high towers. The method of manually adjusting the communication antenna is time-consuming, labor-intensive, costly, has poor adjustment accuracy, and lacks safety. Therefore, the method of automatically adjusting communication antennas remotely has emerged.

The inventor found that there are at least the following problems in the prior art: remote automatic adjustment of the communication antenna is easy to cause a jamming situation, and the maintenance cost is relatively high.

SUMMARY

The purpose of the embodiments of the present application is to provide an antenna installation device that can improve the jamming situation of communication antennas during adjustment and reduce maintenance costs.

In order to solve the above technical problems, the embodiments of the present application provide an antenna installation device, including: a first holding pole component, a second holding pole component, a back panel and an azimuth angle power module. The first holding pole component is fixed on a holding pole. The second holding pole component is fixed on the holding pole. The back panel is rotatably connected to the first holding pole component and the second holding pole component. The back panel is configured to fix an antenna device. One end of the azimuth angle power module is connected to the second holding pole component, and another end of the azimuth angle power module is connected to the back panel. The azimuth angle power module is configured to drive the back panel to rotate around the holding pole to adjust an azimuth angle of the antenna device.

Compared with the prior art, in the embodiments of the present application, since the back panel is rotatably connected to both the first holding pole component and the second holding pole component, that is, the first holding pole component and the second holding pole component are integratedly connected by the back panel, so that driven by the azimuth angle power module, the back panel as a whole can drive the antenna device to rotate around the holding pole, that is, the back panel drives the antenna device to change angle in the horizontal direction. Thus, structurally guaranteeing the coaxiality of the azimuth angle rotation axis of the first holding pole component and the second holding pole component, effectively improving the problem of being jammed when remotely adjusting angle due to errors in the engineering installation process and requiring later maintenance on the tower, and reducing maintenance costs.

BRIEF DESCRIPTION OF THE DRAWINGS

One or more embodiments are exemplified by the figures in the corresponding drawings, and these exemplary illustrations do not constitute limitations to the embodiments. Elements with the same reference numerals in the accompanying drawings represent similar elements. The figures in the accompanying drawings do not constitute limitations on scale unless otherwise stated.

DETAILED DESCRIPTION OF THE EMBODIMENTS

Figure 1:
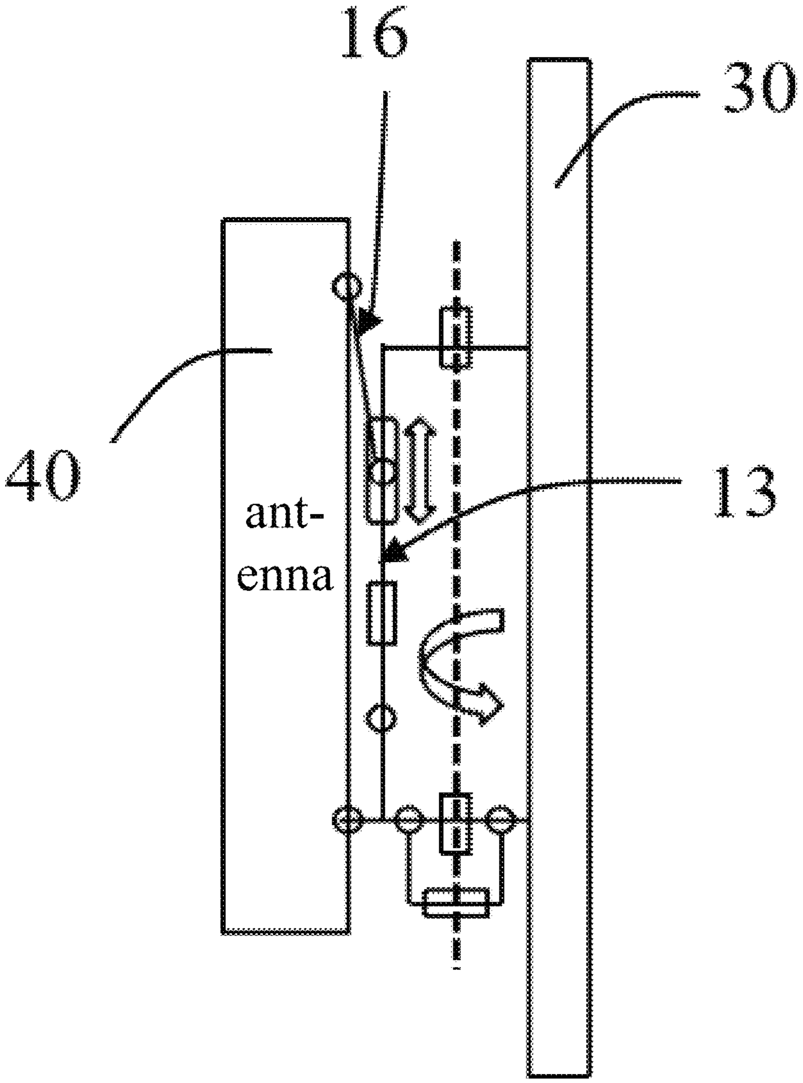
FIG. 1 is a principled schematic view of an antenna installation device provided on a holding pole and fixed with antenna device provided by an embodiment of the present application.

In order to make the purpose, technical solutions and advantages of the embodiments of the present application clearer, each embodiment of the present application will be described in detail below with reference to the accompanying drawings. However, those skilled in the art can understand that in each embodiment of the present application, many technical details are provided to enable readers to better understand the present application. However, even without these technical details and various changes and modifications based on the following embodiments, the technical solution claimed in the present application can also be implemented.

Unless otherwise defined, all technical terms and scientific terms used herein have the same meaning as commonly understood by those skilled in the art belonging to the present application. The terms used herein are for the purpose of describing specific embodiments only and are not intended to limit the application. The terms “include” and “provide” and any variations thereof in the description and claims of the present application and the above description of the accompanying drawings are intended to cover non-exclusive inclusion.

In the description of the embodiments of the present application, the technical terms “first”, “second”, etc. are only used to distinguish different objects, and cannot be understood as indicating or implying the relative importance or implicitly indicating the quantity, specific order or primary and secondary relationship of the technical features indicated.

In the description of the embodiments of the present application, unless otherwise clearly stated and limited, the terms "install", "join", "connect", "fix", etc. should be understood in a broad sense. For example, it can be a fixed connection, a detachable connection, or an integral connection; it can be a mechanical connection or an electrical connection; it can be a direct connection or an indirect connection by an intermediate medium; it can be an internal connection between two components, or the interaction between two components. For those skilled in the art, the specific meanings of the above terms in the embodiments of the present application can be understood according to specific circumstances. The rotatably connection can be any type of connection that can be relatively rotated, such as hinged connection, chain connection, etc., and is not limited here.

When the current equipment is first installed, the azimuth angle of the antenna and the pitch angle of the antenna refer to the data given by the designing institute in the early planning. During the subsequent actual use of the equipment, it is necessary to continuously perform network optimization according to user feedback and measured data, and to adjust the azimuth angle of the antenna and the pitch angle of the antenna for the second time to achieve the best coverage states. For current antenna installation structural parts, when the angle needs to be adjusted a second time after installation, manual operations are required on site. However, communication antennas are usually installed on relatively high towers, manual operation is time-consuming, labor-intensive, costly, has poor adjustment accuracy, and lacks safety. In addition, for stadiums, universities, and transportation hubs, etc. with large traffic tidal effects, it is necessary to perform frequent adjustment of the angle according to the tide of human flow. The existing method of climbing the tower manually cannot guarantee real-time performance.

At present, there are few electrical adjustment installation parts in the industry. Generally, a power module is added to the commonly used manual two-point separation installation parts. The inventor found that for this solution, on the one hand, it is difficult to ensure the coaxiality of the azimuth angle rotation axis of the upper holding pole component and the lower holding pole component during engineering installation, remote electrical adjustment can easily cause a jamming situation, and the maintenance cost is relatively high; on the other hand, the pitch angle motor is placed obliquely in the V-shaped part, due to the size constraints of the motor, a relatively large angle is required in the initial state, thus causing the distance between the equipment and the holding pole is too large, which is not conducive to the safety and reliability of the structure.

Figure 2:
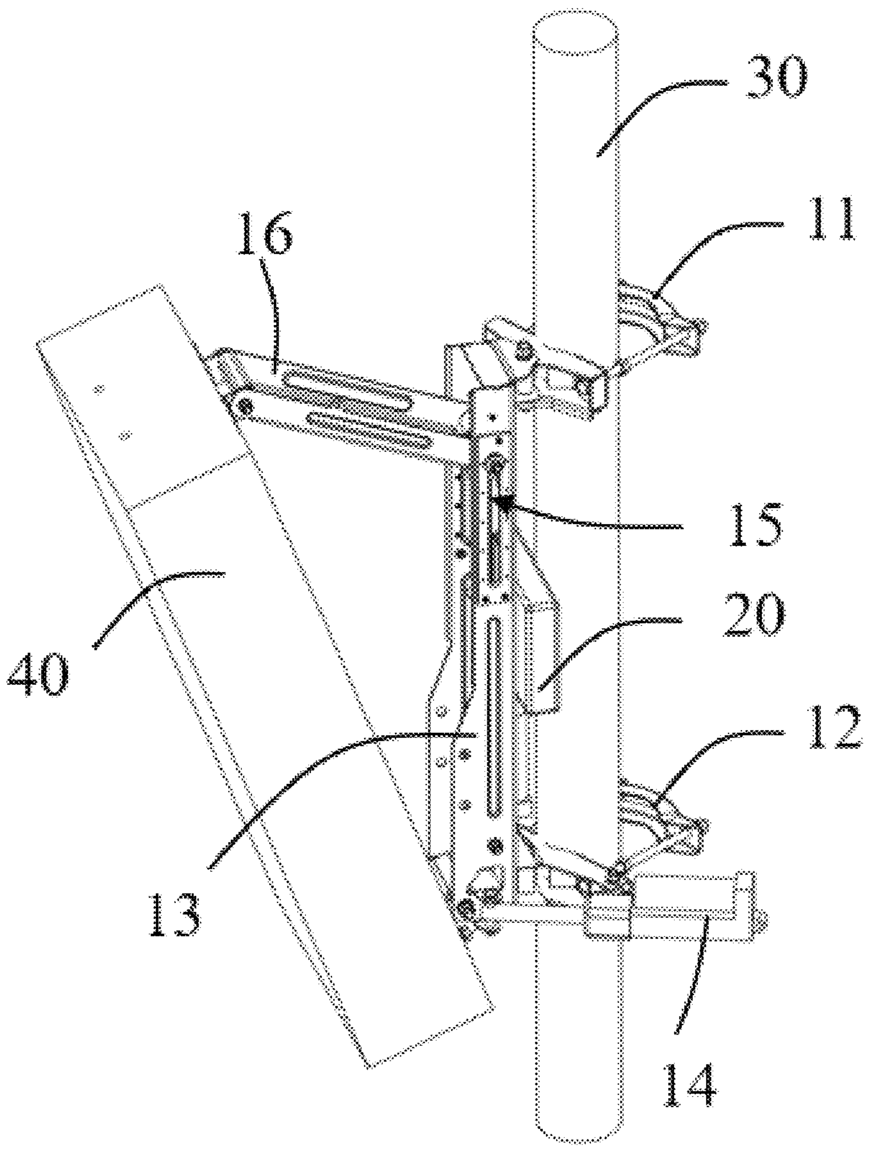
FIG. 2 is a structural schematic view of an antenna installation device provided on a holding pole and fixed with antenna device provided by an embodiment of the present application.
Figure 3:
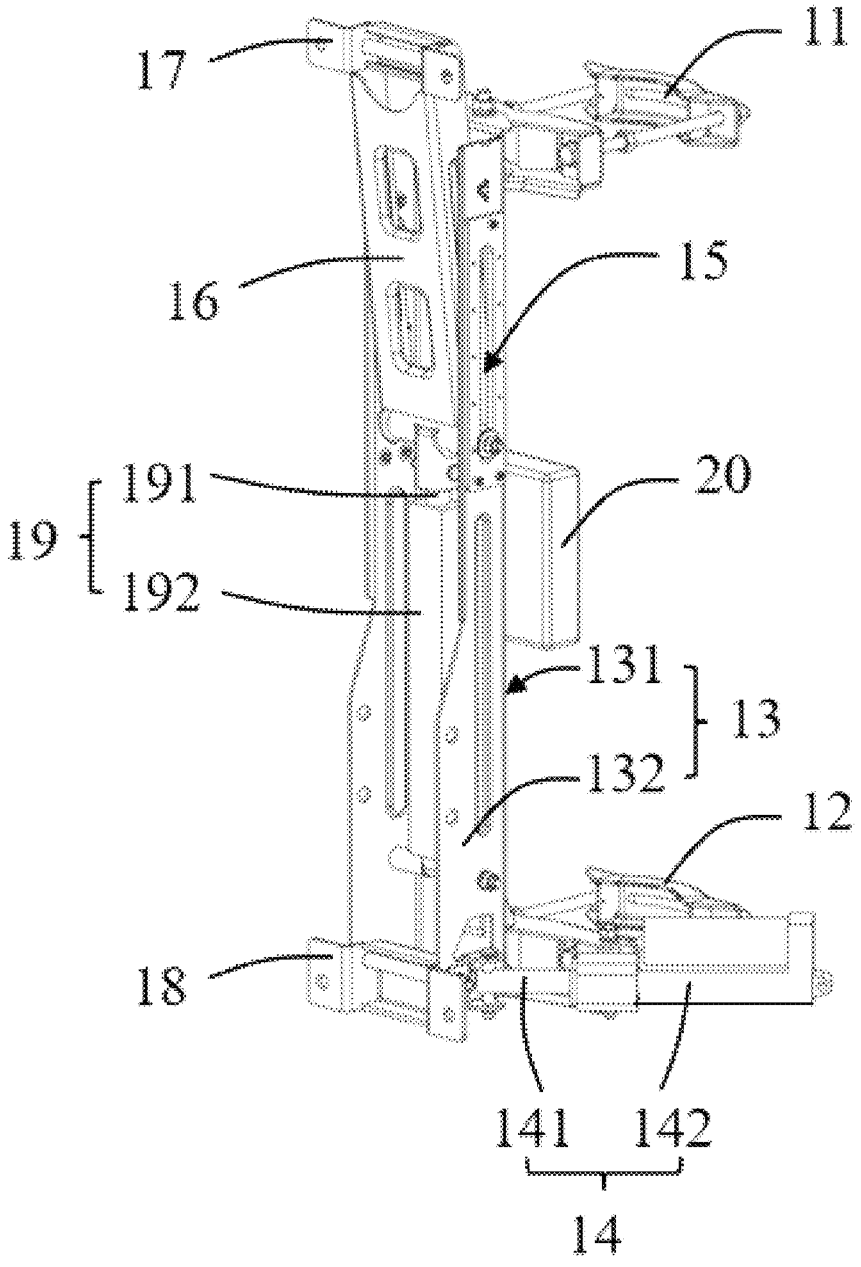
FIG. 3 is a three-dimensional structural schematic view of an antenna installation device provided by an embodiment of the present application.
Figure 4:
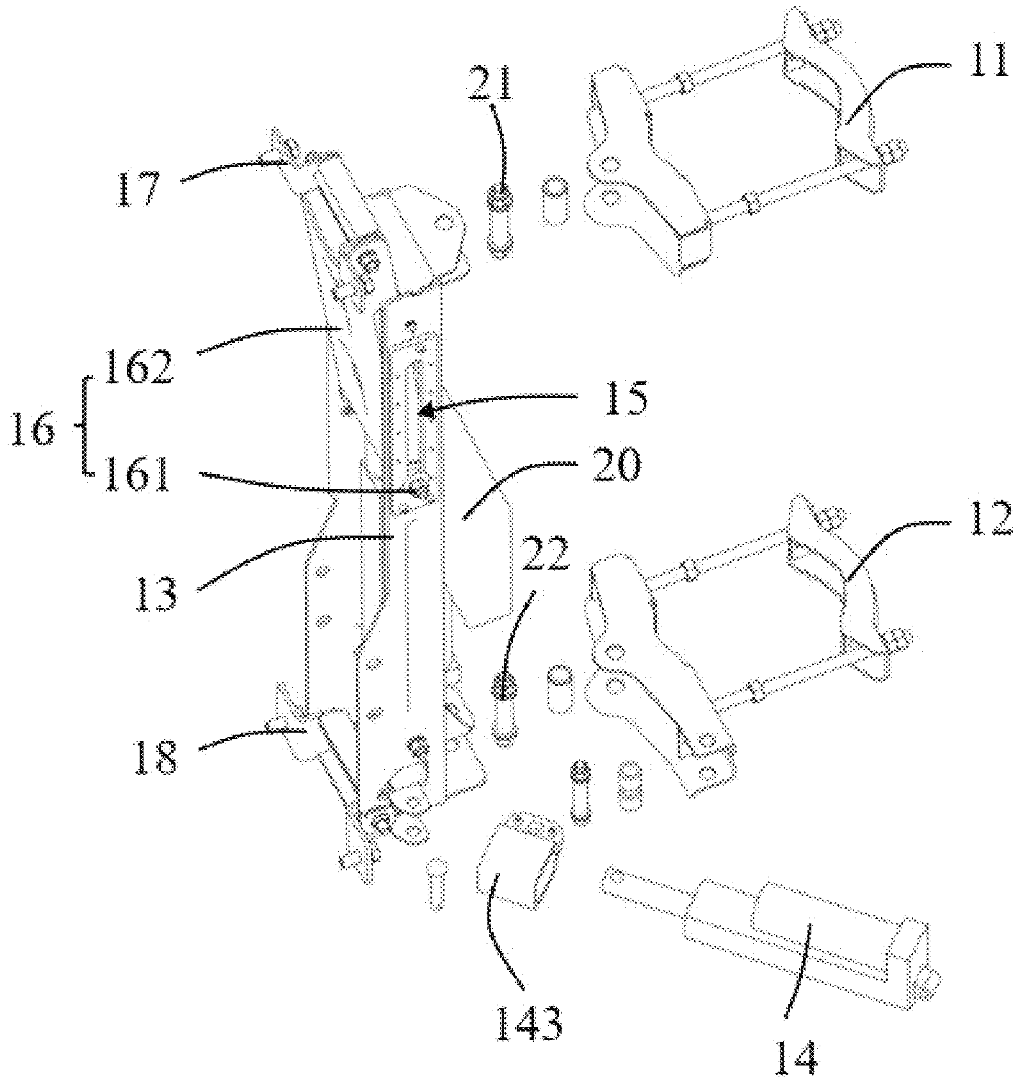
FIG. 4 is an exploded view that after an antenna installation device is partially disassembled provided by an embodiment of the present application.
Figure 5:
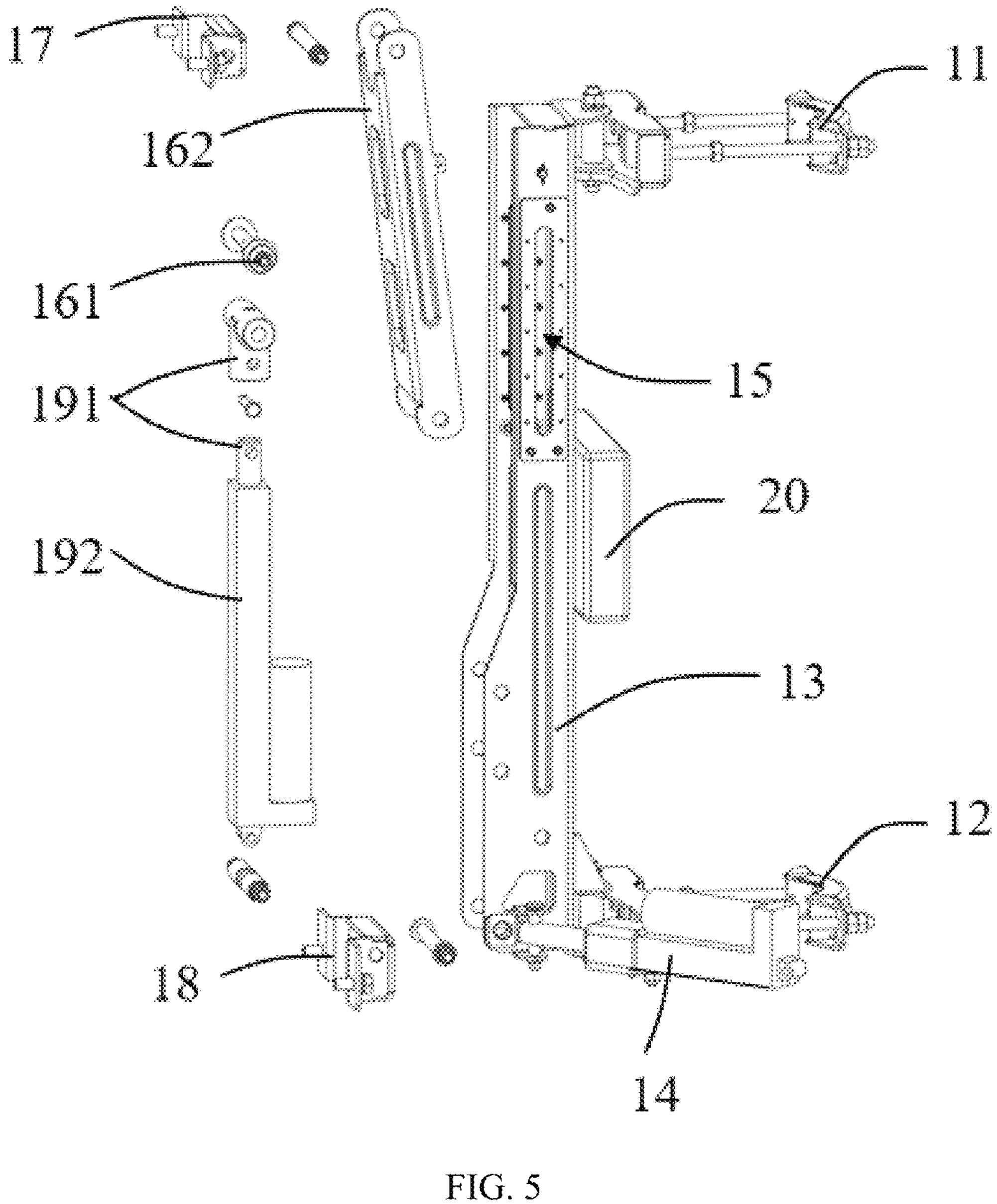
FIG. 5 is an exploded view that after another part of the antenna installation device is disassembled provided by an embodiment of the present application.

Referring to FIG. 1 to FIG. 5, embodiment of the present application relates to an antenna installation device. The core of the embodiment is that the antenna installation device includes a first holding pole component 11 configured to be fixed on a holding pole 30, a second holding pole component 12 configured to be fixed on the holding pole 30, a back panel 13 configured to fix an antenna device 40, and an azimuth angle power module 14. The back panel 13 is rotatably connected to the first holding pole component 11 and the second holding pole component 12. One end of the azimuth angle power module 14 is connected to the second holding pole component 12, and another end of the azimuth angle power module 14 is connected to the back panel 13. The azimuth angle power module 14 is configured to drive the back panel 13 to rotate around the holding pole 30 to adjust an azimuth angle of the antenna device 40.

Since the back panel 13 is rotatably connected to both the first holding pole component 11 and the second holding pole component 12, that is, the first holding pole component 11 and the second holding pole component 12 are integratedly connected by the back panel 13, so that driven by the azimuth angle power module 14, the back panel 13 as a whole can drive the antenna device 40 to rotate around the holding pole 30 (that is, rotate relatively in a horizontal plane perpendicular to the holding pole 30), that is, the back panel 13 drives the antenna device 40 to change angle in the horizontal direction. Thus, structurally guaranteeing the coaxiality of the azimuth angle rotation axis of the first holding pole component 11 and the second holding pole component 12, effectively improving the problem of being jammed when remotely adjusting angle due to errors in the engineering installation process and requiring later maintenance on the tower, guaranteeing the smooth and maintenance-free remote electronic adjustment of the azimuth angle, and reducing maintenance costs. At the same time, automatic electric adjustment is realized by the azimuth angle power module 14, thus avoiding the problems of high cost, poor adjustment accuracy, low safety, and poor real-time performance that occurs when manually adjusting the antenna device 40.

The implementation details of the antenna installation device of the embodiments will be described in detail below. The following content is only implementation details provided for convenience of understanding and is not necessary for implementation of this solution.

Specifically, the azimuth angle power module 14 may include a first driving pole 141 and a first driving part 142 connected to the first driving pole 141. Either one of the first driving pole 141 and the first driving part 142 is rotatably connected to the back panel 13, and another one of the first driving pole 142 and the first driving part 13 is rotatably connected to the second holding pole component 12 (which can be a lower holding pole component, and is located below when installed). When the first driving part 142 drives the first driving pole 141 to stretch or retract, the first driving pole 141 is configured to push the back panel 13 to rotate around the holding pole 30.

When the first driving pole 141 is rotatably connected to the back panel 13, and the first driving part 142 is rotatably connected to the second holding pole component 12, since the first driving part 142 which is heavier than the first driving pole 141 is provided close to the second holding pole component 12, thus causing the center of gravity of the antenna installation device closer to the holding pole 30, and making the installation more stable.

In practical applications, the azimuth angle power module 14 may further include a lateral positioning bracket 143 rotatably connected to the second holding pole component 12, and the lateral positioning bracket 143 is sleeved on the first driving part 142. The lateral positioning bracket 143 is utilized to realize the rotatably connection between the first driving part 142 and other components. In this embodiment, the lateral positioning bracket 143 is rotatably provided on the second holding pole component 12, thereby realizing that the first driving part 142 and the second holding pole component 12 are rotatably connected.

It can be understood that the azimuth angle power module 14 may further include a first gear and a gear driving part connected to the first gear, a second gear is provided on either one of the back panel 13 and the second holding pole component 12, and the other one of the back panel 13 and the second holding pole component 12 is connected to the gear driving part. When the gear driving part drives the first gear to rotate, the first gear meshes to drive the second gear to rotate, so that the second gear drives the back panel 13 to rotate around the holding pole 30. Certainly, the azimuth angle power module 14 can also be driven in other ways, as long as it can drive the back panel 13 to rotate around the holding pole 30, and there is no limitation here.

In an embodiment, the back panel 13 can further be provided with a chute 15, and the antenna installation device can further include a connecting bracket 16, one end of the connecting bracket 16 is slidingly provided in the chute 15, and the other end of the connecting bracket 16 is configured to be rotatably connected to the antenna device 40. When one end of the connecting bracket 16 is in the chute 15, the distance between the other end of the connecting bracket 16 and the back panel 13 changes, thereby driving the downtilt angle of the antenna device 40 to change, thus realizing the adjustment of the downtilt angle of the antenna device 40. Due to the structure of the connecting bracket 16 sliding in the chute 15, its original size is not constrained by the distance between the antenna device 40 and the holding pole 30, and the push pole stroke is larger, thus effectively reducing the distance between the antenna device 40 and the holding pole 30, improving the safety and reliability of the entire system, and being able to effectively improve the angle adjustment accuracy of the downtilt angle.

Specifically, the antenna installation device may further include a first support 17 (which may be an upper support) for fixing the antenna device 40 and a second support 18 (which may be a lower support) for fixing the antenna device 40. The first support 17 is rotatably connected to the connecting bracket 16, and the second support 18 is rotatably connected to the back panel 13. The first support 17 and the second support 18 can be provided with installation holes. By the cooperation of screws and installation holes, realizing the fixed installation of the first support 17 and the second support 18 with the antenna device 40 respectively.

In practical applications, the antenna installation device may further include a pitch angle power module 19 fixed on the back panel 13, the pitch angle power module 19 includes a second driving pole 191 and a second driving part 192 connected to the second driving pole 191. One end of the second driving pole 191 and one end of the connecting bracket 16 can rotate relative to each other. When the second driving part 192 drives the second driving pole 191 to stretch or retract along a direction parallel to the back panel 13, the second driving pole 191 pushes one end of the connecting bracket 16 to slide in the chute 15, thus causing the angle between the connecting bracket 16 and the back panel 13 to change, so as to adjust a downtilt angle (that is, pitch angle) of the antenna device 40. That is to say, by setting the vertical chute 15 (that is, the sliding direction of the connecting bracket 16 in the chute 15 is parallel to the direction of the back panel 13 and parallel to the extension direction of the holding pole 30) to arrange the pitch angle power module 19, thereby avoiding the pitch angle power module 19 constraining the initial state of the connecting bracket 16, the push pole stroke is larger, thereby effectively reducing the distance between the antenna device 40 and the holding pole 30, and improving the safety and reliability of the entire system.

In an embodiment, the pitch angle power module 19 is provided at one end of the back panel 13 close to the second holding pole component 12. That is to say, during actual use, the first holding pole component 11 may be an upper holding pole component (at the top when installed), and the second holding pole component 12 may be a lower holding pole component (at the bottom when installed). The chute 15 and the connecting bracket 16 are close to the upper holding pole component, the pitch angle power module 19 and the azimuth angle power module 14 are close to the lower holding pole component. Thus, the center of gravity of the antenna installation device is lowered, thus making the installation more stable.

In this embodiment, the back panel 13 may include a bottom panel 131 and a side panel 132 connected to the bottom panel 131, and the chute 15 is provided on the side panel 132. The connecting bracket 16 may include a sliding shaft 161 slidingly provided in the chute 15, and a main body 162 rotatably connected to the sliding shaft 161. The second driving pole 191 is rotatably connected to the sliding shaft 161. Since the sliding shaft 161 can realize sliding by rotating in the chute 15, thereby reducing the resistance overcome by the sliding shaft 161 during the sliding process, and reducing the energy consumption of the pitch angle power module 19.

It can be understood that either one of the main body 162 and the second driving pole 191 is rotatably connected to the sliding shaft 161, so that it can realize that the second driving pole 191 drives the connecting bracket 16 to rotate. Or, the main body 162 and the sliding shaft 161 are fixedly connected, and the second driving pole 191 is abutted against the sliding shaft 161 (the second driving pole 191 resists the sliding shaft 161 to apply driving force). At this time, the angle between the connecting bracket 16 and the second driving pole 191 can still change, thereby realizing that the second driving pole 191 drives the connecting bracket 16 to rotate.

Specifically, the back panel 13 may include a first surface and a second surface opposite to the first surface, the first holding pole component 11 and the second holding pole component 12 are both provided at the first surface, and the pitch angle power module 19 is provided at the second surface. That is to say, the bottom panel 131 includes a first surface and a second surface provided opposite to the first surface, the side panel 132 extends toward one side of the second surface, and the pitch angle power module 19 is provided in the space surrounded by the side panel 132. The first holding pole component 11 and the second holding pole component 12 are both provided at the first surface, and can be fixed on the side panel 132. Setting in this way, on the one hand, it is convenient for the pitch angle power module 19 to drive the back panel 13; on the other hand, it can avoid occupying the space between the back panel 13 and the holding pole 30.

Further, the antenna installation device may further include a control box 20 provided at the first surface, and the control box 20 is electrically connected to the azimuth angle power module 14 and the pitch angle power module 19. The control box 20 may include wireless communication equipment (for example, a Bluetooth module) and a control chip. The wireless communication equipment receives the control signal sent by the terminal, and transmits the control signal to the control chip. The control chip sends the control instructions to the azimuth angle power module 14 and the pitch angle power module 19 to adjust the azimuth angle and pitch angle respectively.

In actual application, the antenna installation device may further include a first rotation axis 21 and a second rotation axis 22. The first holding pole component 11 is rotatably connected to the back panel 13 via the first rotation axis 21. The second rotation axis 22 and the first rotation axis 21 are coaxial, and the second holding pole component 12 is rotatably connected to the back panel 13 via the second rotation axis 22. The back panel 13 utilizes the first rotation axis 21 and the second rotation axis 22 to rotate around the holding pole 30.

In practical application, the back panel 13 can be hinged with the first holding pole component 11 (which can be an upper holding pole component) and the second holding pole component 12 (which can be a lower holding pole component) by the azimuth angle rotation axis. One end of the azimuth angle power module 14 provided on the side surface is hinged with the back panel 13, and another end of the azimuth angle power module 14 is hinged with the lower holding pole component, thus, the relative rotation of the back panel 13 in a horizontal plane perpendicular to the holding pole 30 can be remotely realized. The upper part of the back panel 13 is vertically provided with a chute 15, and a pitch angle power module 19 is provided inside. One end of the pitch angle power module 19 is hinged with the lower part of the back panel 13, and the other end of the pitch angle power module 19 is hinged to one end of the connecting bracket 16 in the chute 15 by a pin. The other end of the connecting bracket 16 is hinged with the first support 17 (which can be an upper bracket) on the side of the antenna device 40. The second support 18 (can be a lower bracket) on the side of the antenna device 40 is hinged with the lower end of the back panel 13. Controlling one end of the connecting bracket 16 to slide up and down in the chute 15 by the expansion and contraction of the pitch angle power module 19, so that the downtilt angle can be adjusted remotely.

During actual use, the upper bracket of the antenna installation device and the lower bracket of the antenna installation device are respectively fixed to the equipment by bolts, and then the upper holding pole component and the lower holding pole component are installed on the holding pole 30, so that the remote adjustment of the azimuth angle and the downtilt angle can be respectively completed by the azimuth angle power module 14 and the pitch angle power module 19.

Those of skilled in the art can understand that the above-mentioned embodiments are specific examples for implementing the present application. In practical applications, various changes can be made in form and details without departing from the spirit and scope of the present application.

What is claimed is:

1. An antenna installation device, comprising:
- a first holding pole component fixed on a holding pole;
- a second holding pole component fixed on the holding pole;
- a back panel rotatably connected to the first holding pole component and the second holding pole component, wherein the back panel is configured to fix an antenna device; and
- an azimuth angle power module, wherein one end of the azimuth angle power module is connected to the second holding pole component, and another end of the azimuth angle power module is connected to the back panel; the azimuth angle power module is configured to drive the back panel to rotate around the holding pole to adjust an azimuth angle of the antenna device,
- wherein the back panel is provided with a chute, the antenna installation device further comprises a connecting bracket, one end of the connecting bracket is slidingly provided in the chute, and another end of the connecting bracket is rotatably connected to the antenna device.

2. The antenna installation device according to claim 1, wherein:
- the azimuth angle power module comprises a first driving pole and a first driving part connected to the first driving pole;
- either one of the first driving pole and the first driving part is rotatably connected to the back panel, and another one of the first driving pole and the first driving part is rotatably connected to the second holding pole component; and
- in response to that the first driving part drives the first driving pole to stretch or retract, the first driving pole is configured to push the back panel to rotate around the holding pole.

3. The antenna installation device according to claim 2, wherein the azimuth angle power module further comprises a lateral positioning bracket rotatably connected to the second holding pole component, and the lateral positioning bracket is sleeved on the first driving part.

4. The antenna installation device according to claim 1, further comprising:
- a first support for fixing the antenna device; and
- a second support for fixing the antenna device,
- wherein the first support is rotatably connected to the connecting bracket, and the second support is rotatably connected to the back panel.

5. The antenna installation device according to claim 1, further comprising:
- a pitch angle power module fixed on the back panel,
- wherein the pitch angle power module comprises a second driving pole and a second driving part connected to the second driving pole; and
- in response to that the second driving part drives the second driving pole to stretch or retract along a direction parallel to the back panel, the second driving pole pushes one end of the connecting bracket to slide in the chute to adjust a downtilt angle of the antenna device.

6. The antenna installation device according to claim 5, wherein the back panel comprises a bottom panel and a side panel connected to the bottom panel, and the chute is provided on the side panel; and
- the connecting bracket comprises a sliding shaft slidingly provided in the chute, and a main body rotatably connected to the sliding shaft; the second driving pole is rotatably connected to the sliding shaft.

7. The antenna installation device according to claim 5, wherein the back panel comprises a first surface and a second surface opposite to the first surface, the first holding pole component and the second holding pole component are both provided at the first surface, and the pitch angle power module is provided at the second surface.

8. The antenna installation device according to claim 7, further comprising:
- a control box provided at the first surface and electrically connected to the azimuth angle power module and the pitch angle power module.

9. The antenna installation device according to claim 1, further comprising:
- a first rotation axis, wherein the first holding pole component is rotatably connected to the back panel via the first rotation axis; and a second rotation axis coaxial with the first rotation axis, wherein the second holding pole component is rotatably connected to the back panel via the second rotation axis.

* * * * *